US011988371B1

(12) United States Patent
Xiao

(10) Patent No.: US 11,988,371 B1
(45) Date of Patent: May 21, 2024

(54) STARRY SKY LAMP WITH GOOD HEAT DISSIPATION EFFECT

(71) Applicant: Xianhai Xiao, Ji'an (CN)

(72) Inventor: Xianhai Xiao, Ji'an (CN)

( * ) Notice: Subject to any disclaimer, the term of this patent is extended or adjusted under 35 U.S.C. 154(b) by 0 days.

(21) Appl. No.: 18/493,973

(22) Filed: Oct. 25, 2023

(51) Int. Cl.

| | |
|---|---|
| ***F21V 29/503*** | (2015.01) |
| ***F21V 15/01*** | (2006.01) |
| ***F21V 29/67*** | (2015.01) |
| *F21W 121/00* | (2006.01) |

(52) U.S. Cl.
CPC ............ *F21V 29/503* (2015.01); *F21V 15/01* (2013.01); *F21V 29/677* (2015.01); *F21W 2121/008* (2013.01)

(58) Field of Classification Search
CPC ...... F21V 29/503; F21V 15/01; F21V 29/677; F21W 2121/008
See application file for complete search history.

(56) References Cited

U.S. PATENT DOCUMENTS

2011/0080740 A1* 4/2011 Allen ...................... F21K 9/235 362/294
2011/0089830 A1* 4/2011 Pickard ................... F21V 29/74 315/32
2016/0334093 A1* 11/2016 Stack ...................... F21V 29/77
2017/0175963 A1* 6/2017 Lentine ................. F21V 23/001
2019/0230324 A1* 7/2019 Chien ..................... F21K 9/232

* cited by examiner

*Primary Examiner* — Kevin Quarterman
(74) *Attorney, Agent, or Firm* — Jeenam Park

(57) ABSTRACT

Disclosed is a starry sky lamp with good heat dissipation effect. The lamp includes a shell, and a laser and a circuit board arranged in the shell, where the laser is electrically connected with the circuit board, and further includes a light-transmitting cover and a heat dissipation fan, where the heat dissipation fan is arranged in the shell, and the heat dissipation fan is electrically connected with the circuit board and blows air towards the laser; and the shell is provided with an opening, the light-transmitting cover is installed at the opening, the light-transmitting cover is a semi-circular hollow structure, and a starry sky effect pattern cutting surface is arranged inside the light-transmitting cover.

9 Claims, 8 Drawing Sheets

STARRY SKY LAMP WITH GOOD HEAT DISSIPATION EFFECT

TECHNICAL FIELD

The present disclosure relates to the field of starry sky lamps, and particularly relates to a starry sky lamp with good heat dissipation effect.

BACKGROUND

The starry sky lamp is an ambient lamp capable of projecting a variety of wonderful starry sky effects, and is deeply loved by ambient lamp enthusiasts.

Starry sky lamps are all made up of laser lamp sets, resulting in that a lot of heat is generated after working for a long time. If the heat dissipation effect of a lamp is poor, it might cause damage or malfunction of the laser lamp sets, which will affect the user's experience. In order to further improve the heat dissipation effect thereof, it is necessary to invent a starry sky lamp with good heat dissipation effect.

SUMMARY

An objective of the present disclosure is to provide a starry sky lamp with good heat dissipation effect, and to alleviate the problems that none of the existing starry sky lamps fully utilizes the heat dissipation function of the shell when cooling the laser and the heat dissipation effect needs to be further improved.

The present disclosure is implemented as follows: the present disclosure discloses a starry sky lamp with good heat dissipation effect. The lamp includes a shell, and a laser and a circuit board arranged in the shell, where the laser is electrically connected with the circuit board, and further includes a light-transmitting cover and a heat dissipation fan, where the heat dissipation fan is arranged in the shell, and the heat dissipation fan is electrically connected with the circuit board and blows air towards the laser; and the shell is provided with an opening, the light-transmitting cover is installed at the opening, the light-transmitting cover is a semi-circular hollow structure, a starry sky effect pattern cutting surface is arranged inside the light-transmitting cover, and the laser beam emitted by the laser is reflected and transmitted through the light-transmitting cover, to form a starry sky pattern under the action of the starry sky effect pattern cutting surface.

Further, the shell includes a bottom shell and a spotlight cover, where an upper end of the bottom shell is opened, the spotlight cover is installed at the upper end of the bottom shell, and the opening formed on the shell is located on the spotlight cover.

Further, the bottom shell is provided with a flat plate portion, a connecting tube base is arranged on the flat plate portion, and the connecting tube base is located in the bottom shell; a plurality of snap blocks are arranged on the upper end of the bottom shell, and the snap blocks and the connecting tube base are respectively located at opposite ends of the bottom shell; the spotlight cover is provided with a snap plate portion and a connecting tube portion, where the snap plate portion is provided with a plurality of snap-fitting holes corresponding to the snap blocks one by one, the connecting tube portion is provided with threaded holes, the positions of the snap-fitting holes and the connecting tube portion correspond to the snap blocks and the connecting tube base respectively, the connecting tube base and the connecting tube portion are connected by bolts penetrating into the connecting tube base, and the screw portion of the bolt is screwed into the threaded hole of the connecting tube portion.

Further, the light-transmitting cover includes a semi-circular hollow structure portion and a flat flange portion, where the semi-circular hollow structure portion and the flat flange portion share a common central axis, the outer diameter of the flat flange portion is greater than the outer diameter of the semi-circular hollow structure portion, the opening is a circular opening with a diameter same as the outer diameter of the semi-circular hollow structure portion, and the semi-circular hollow structure portion extends out of the shell from the opening.

Further, the spotlight cover is provided with a concave spotlight reflecting surface, and the opening is arranged at the center of the spotlight reflecting surface.

Further, the bottom shell is provided with a power switch hole, the circuit board is electrically connected with a power switch button, and the power switch button is arranged at the position of the power switch hole.

Further, the bottom shell is provided with a power supply socket, the circuit board is electrically connected with a power plug, and the power plug is arranged in the power supply socket.

Further, the shell is made of metal materials, and the inner and outer surfaces of the shell are coated with a layer of oxidized graphene insulation and heat dissipation coating.

Further, the shell is provided with a plurality of heat dissipation holes, and a dustproof sponge is arranged inside the shell, where the dustproof sponge covers the plurality of heat dissipation holes.

Compared with the prior art, the present disclosure features the following beneficial effects:

1. The present disclosure fully utilizes the heat dissipation function of the shell when cooling the laser, further improving the heat dissipation effect.
2. The shell of the present disclosure includes a bottom shell and a spotlight cover, where the bottom shell and the spotlight cover are connected simultaneously through a clamping structure and a bolt structure, which ensures the stability of connection while facilitating disassembly.
3. The spotlight cover is provided with a concave spotlight reflecting surface, the light-transmitting cover is arranged at the center of the spotlight reflecting surface, and configuration of the spotlight reflecting surface enhances the light-emitting effect of a starry sky lamp.

In the figures: 1. bottom shell; 11. flat plate portion; 12. connecting tube base; 13. snap block; 14. power switch hole; 15. power supply socket; 2. spotlight cover; 21. opening; 22. snap plate portion; 23. connecting tube portion; 24. spotlight reflecting surface; 3. light-transmitting cover; 31. semi-circular hollow structure portion; 32. flat flange portion; 4. power switch button.

DESCRIPTION OF EMBODIMENTS

In the present disclosure, unless otherwise explicitly specified and defined, the terms "mounting", "connecting", "connection", "fixing", etc. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. For those of ordinary skill in the art, the specific meanings of the above terms in the present disclosure may be understood according to specific circumstances.

The present disclosure will be further described below with reference to the accompanying drawings and the specific embodiments.

Figure 1:
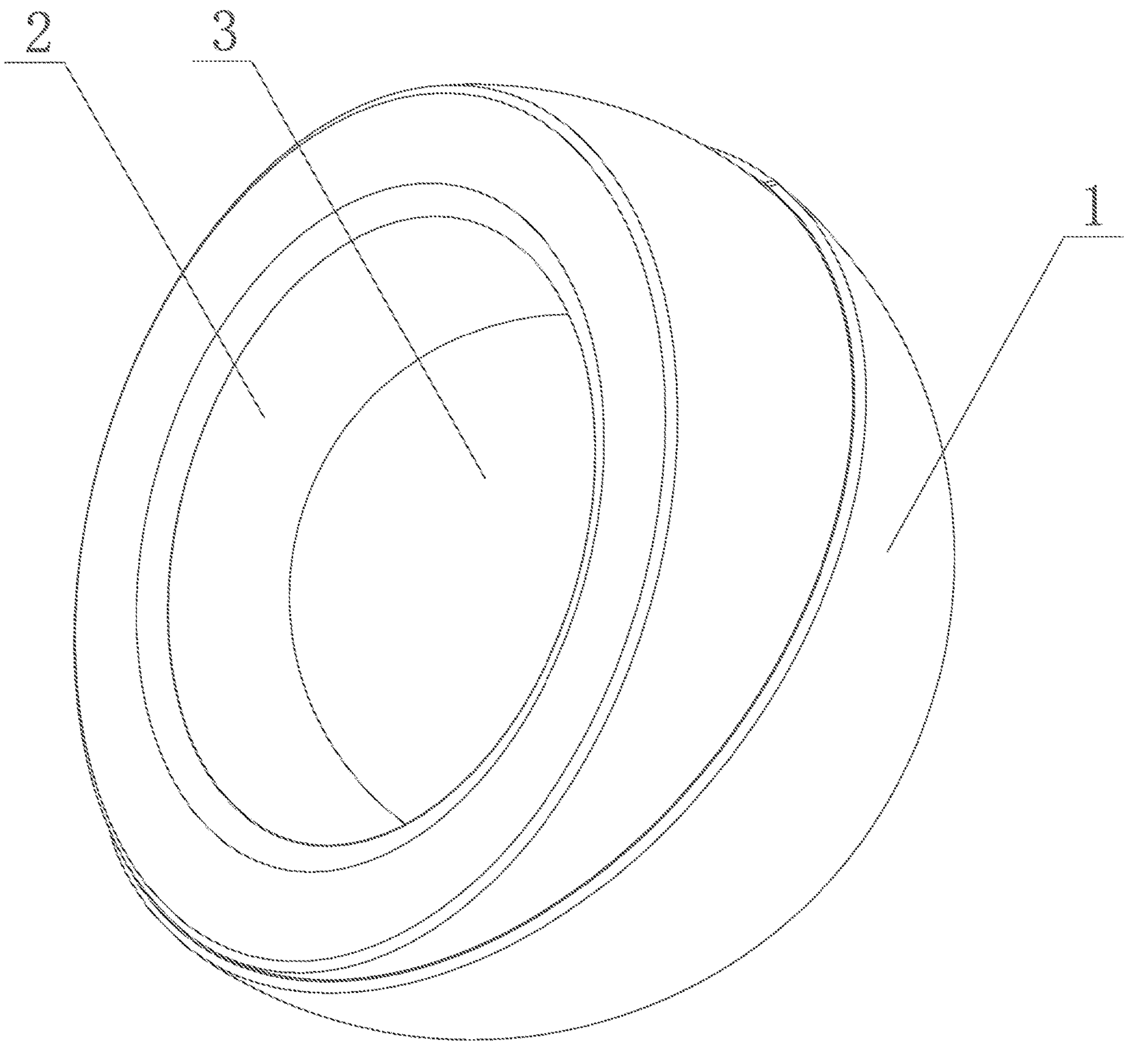
FIG. 1 is a schematic diagram of a three-dimensional structure of the present disclosure at the front depression angle.
Figure 2:
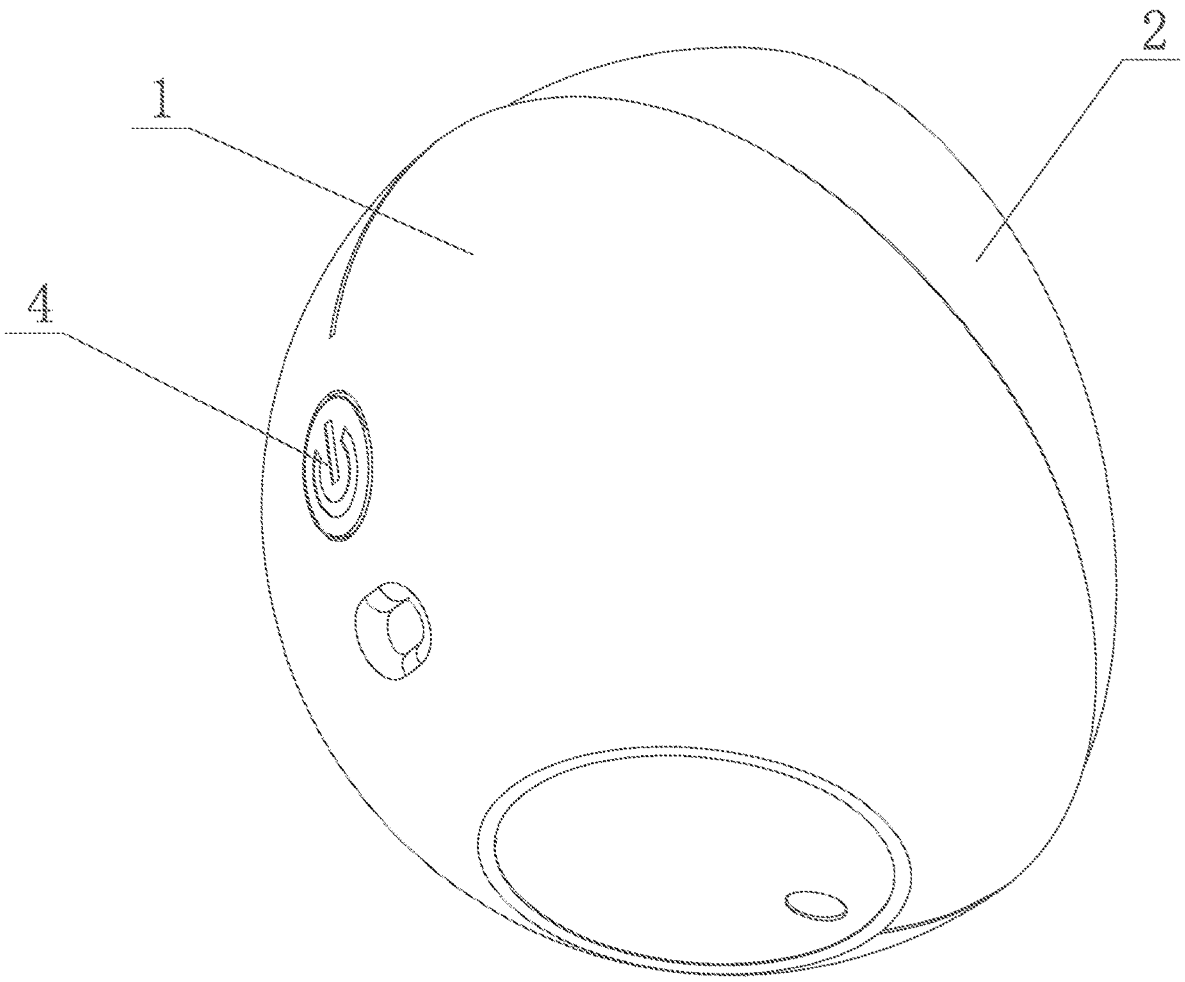
FIG. 2 is a schematic diagram of the three-dimensional structure of the present disclosure at the rear depression angle.
Figure 3:
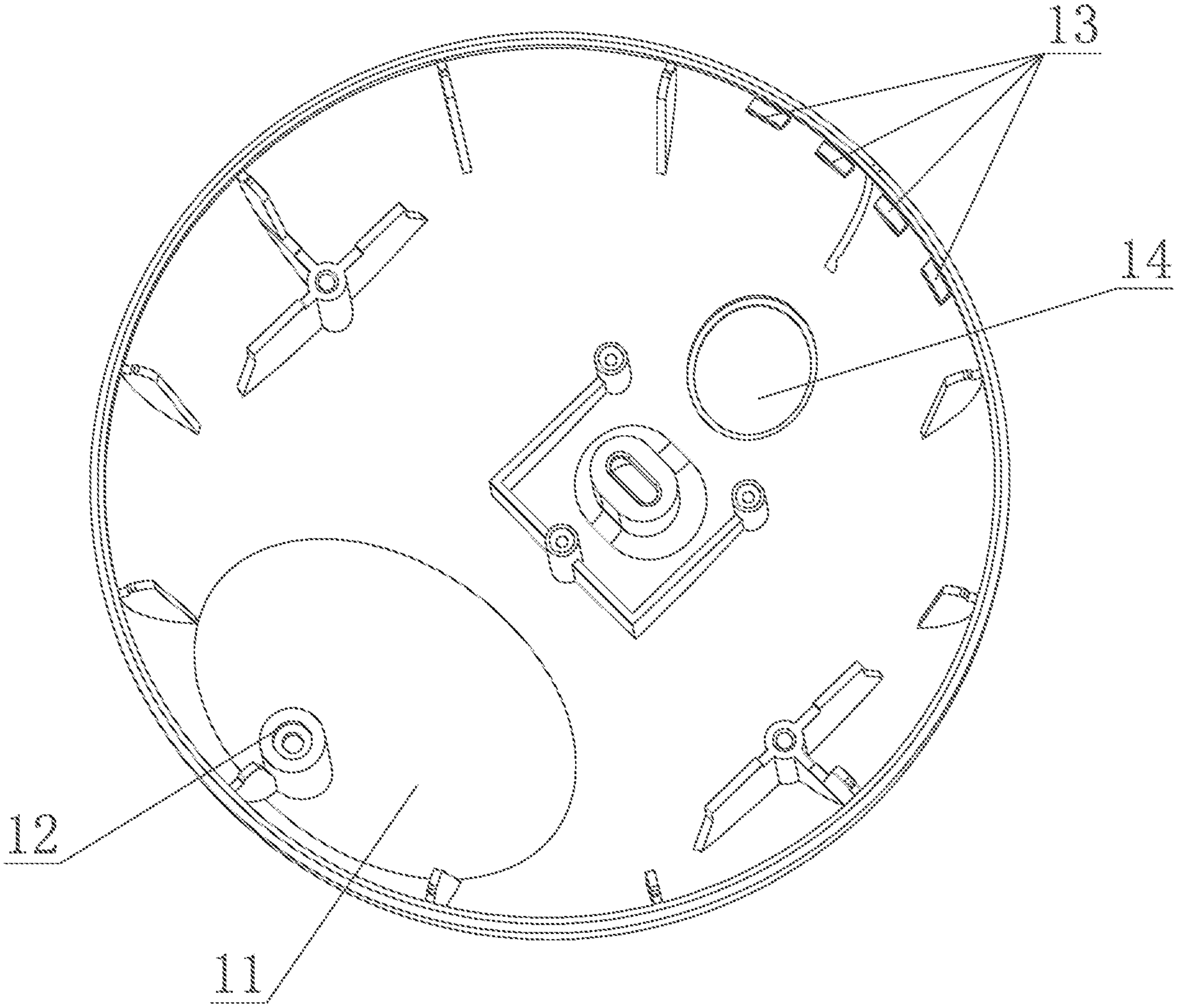
FIG. 3 is a schematic diagram of an internal structure of a bottom shell of the present disclosure.
Figure 8:
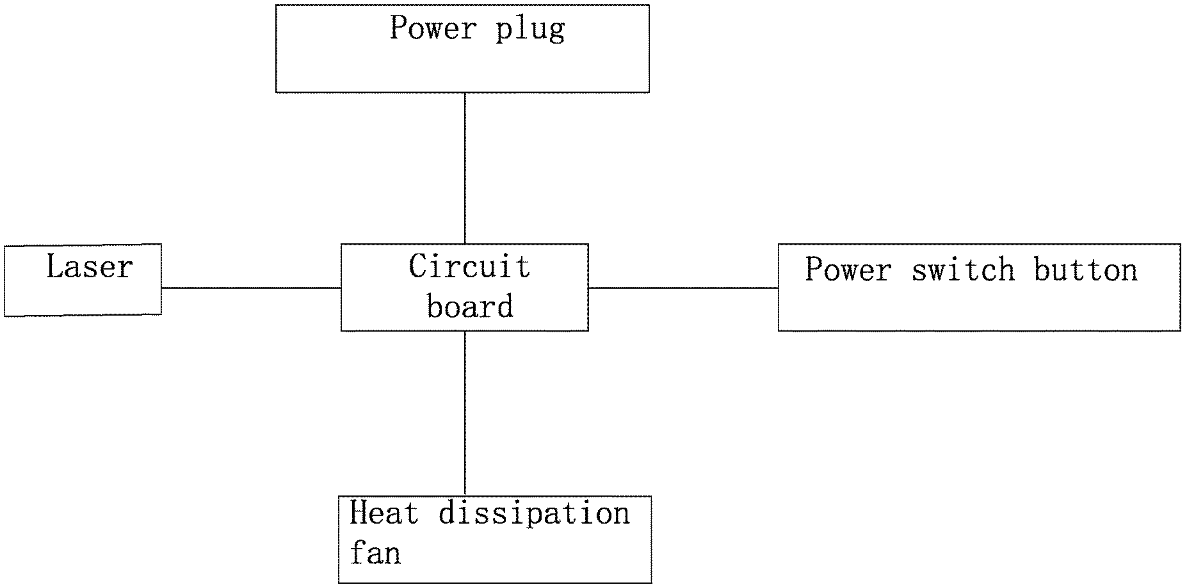
FIG. 8 is a block diagram of an electronic control structure of the present disclosure.

A starry sky lamp with good heat dissipation effect, as shown in FIGS. 1, 2, and 8, includes a shell, and a laser and a circuit board arranged in the shell, and further includes a light-transmitting cover 3, a power switch button 4, a power plug, and a heat dissipation fan. The laser, the power switch button 4, the power plug, and the heat dissipation fan are all electrically connected with the circuit board, where the power plug is configured to connect an external power supply, and the power switch button 4 is configured to turn on the laser and the heat dissipation fan. The heat dissipation fan blows towards the laser, and is configured to cool the laser.

In some exemplary embodiments, a battery is further arranged in the shell to supply power to the laser and the heat dissipation fan.

In some exemplary embodiments, a heat dissipation base and a patch-type temperature sensor are further installed in the shell, where the patch-type temperature sensor is also electrically connected with the circuit board. Both the laser and the patch-type temperature sensor are installed on the heat dissipation base, and the patch-type temperature sensor is configured to detect the temperature of the heat dissipation base. When the temperature reaches the preset temperature inside the circuit board chip, the heat dissipation fan is controlled to start, so that more energy can be saved.

Figure 6:
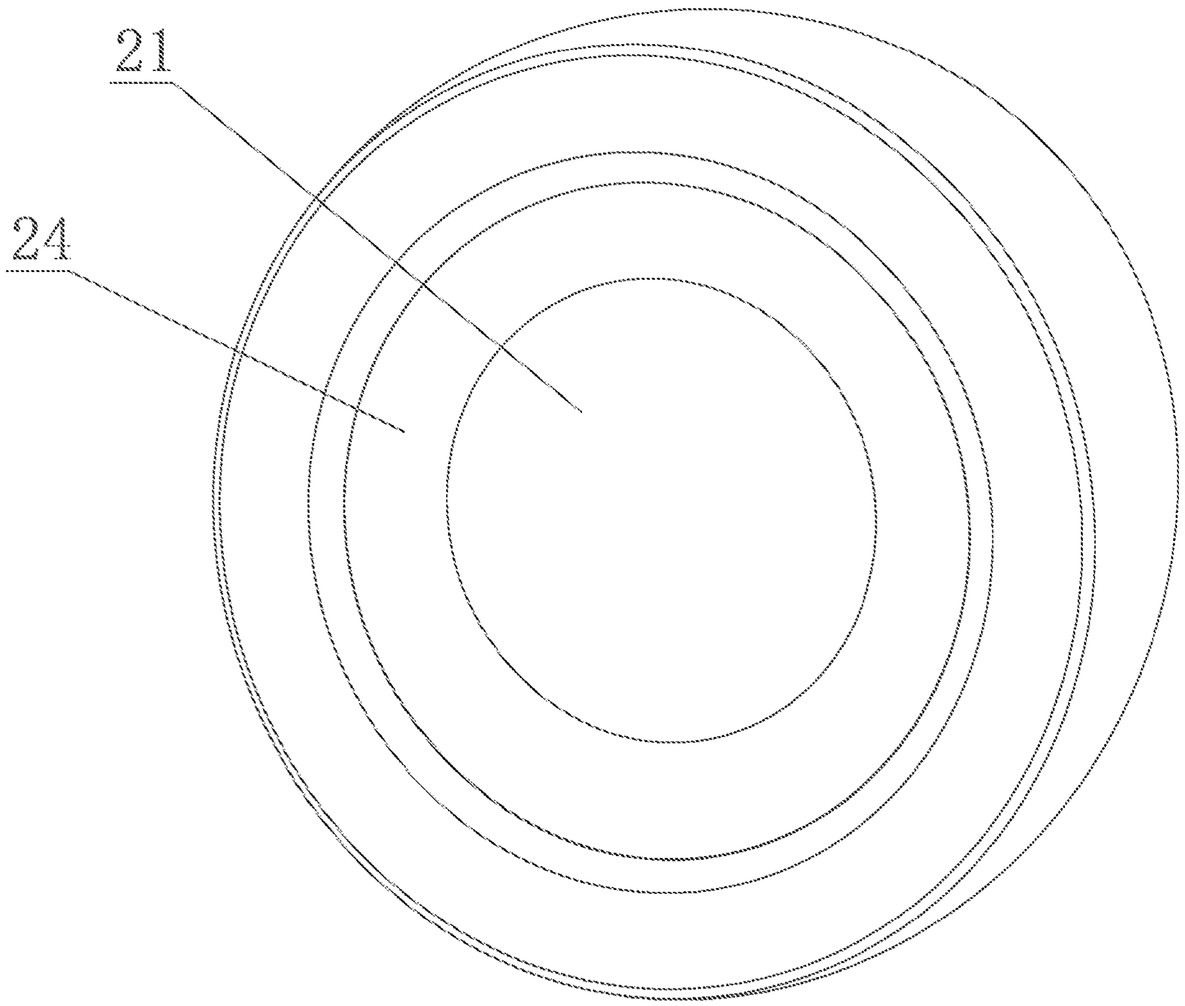
FIG. 6 is a schematic diagram of an external structure of the spotlight cover of the present disclosure.
Figure 7:
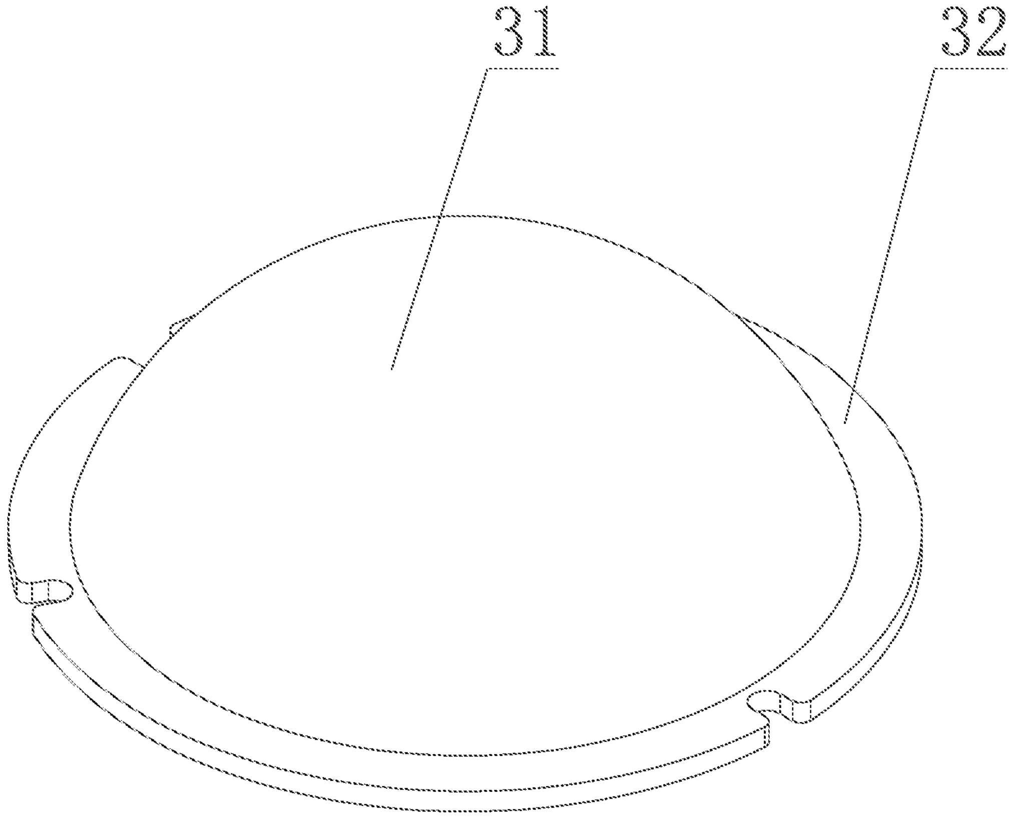
FIG. 7 is a schematic diagram of a three-dimensional structure of a light-transmitting cover of the present disclosure.

As shown in FIGS. 1, 6, and 7, the shell includes a bottom shell 1 and a spotlight cover 2, the spotlight cover 2 is provided with an opening 21, the light-transmitting cover 3 includes a semi-circular hollow structure portion 31 and a flat flange portion 32, where the semi-circular hollow structure portion 31 and the flat flange portion 32 share a common central axis, the outer diameter of the flat flange portion 32 is greater than the outer diameter of the semi-circular hollow structure portion 31, the opening 21 is a circular opening with a diameter same as the outer diameter of the semi-circular hollow structure portion 31, and the semi-circular hollow structure portion 31 extends out of the shell from the opening 21. The spotlight cover 2 is provided with a concave spotlight reflecting surface 24, the opening 21 is arranged at the center of the spotlight reflecting surface 24, and configuration of the spotlight reflecting surface 24 can enhance the light-emitting effect of a starry sky lamp. A starry sky effect pattern cutting surface is arranged inside the semi-circular hollow structure portion 31 of the light-transmitting cover 3, and the laser beam emitted by the laser is reflected and transmitted through the light-transmitting cover 3, to form a starry sky pattern under the action of the starry sky effect pattern cutting surface. An arc-shaped reflecting plate with a semi-circular hollow structure can be installed in the shell, and the diameter of the reflecting plate is the same as that of the semi-circular hollow structure portion 31. The reflecting plate has a notch structure and arranged opposite to the semi-circular hollow structure portion 31, and the laser beam generated by the laser is first irradiated on the reflecting plate, and then is reflected and transmitted through the light-transmitting cover 3 after reflection by means of the reflecting plate.

As shown in FIGS. 3-6, an upper end of the bottom shell 1 is opened, and the bottom shell 1 is provided with a flat plate portion 11 to stably arrange the starry sky lamp. A connecting tube base 12 is arranged on the flat plate portion 11, the connecting tube base 12 is located in the bottom shell 1, and the connecting tube base 12 is provided with a through hole that penetrates the flat plate portion 11. Four snap blocks 13 are arranged on the upper end of the bottom shell 1, and the snap blocks 13 and the connecting tube base 12 are respectively located at opposite ends of the bottom shell 1. The spotlight cover 2 is provided with a snap plate portion 22 and a connecting tube portion 23, where the snap plate portion 22 is provided with four snap-fitting holes corresponding to the snap blocks 13 one by one, the connecting tube portion 23 is provided with threaded holes, the positions of the snap-fitting holes and the connecting tube portion 23 correspond to the snap blocks 13 and the connecting tube base 12 respectively, the connecting tube base 12 and the connecting tube portion 23 are connected by bolts penetrating into the connecting tube base 12, and the screw portion of the bolt is screwed into the threaded hole of the connecting tube portion 23. Such arrangement results in that the bottom shell 1 and the spotlight cover 2 are connected simultaneously through a clamping structure and a bolt structure, which ensures the stability of connection while facilitating disassembly.

Figure 4:
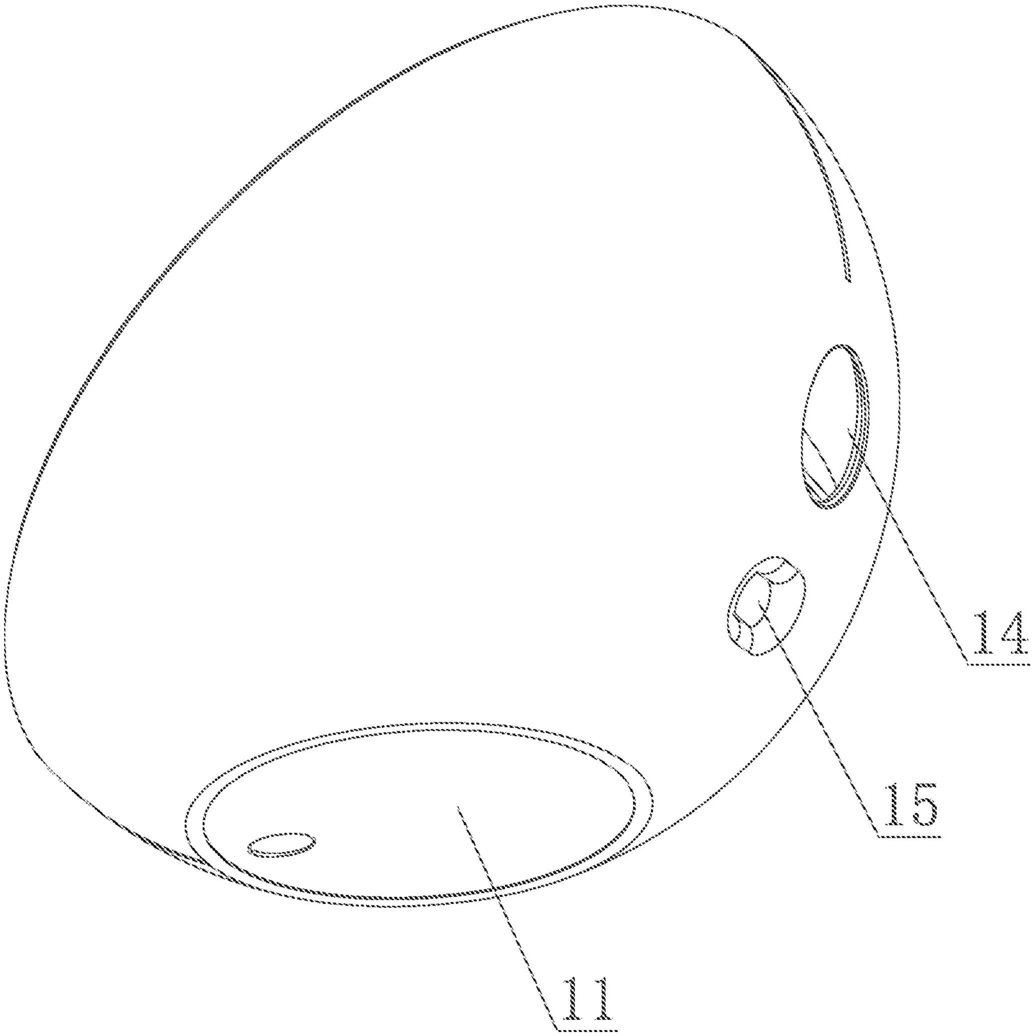
FIG. 4 is a schematic diagram of an external structure of the bottom shell of the present disclosure.
Figure 5:
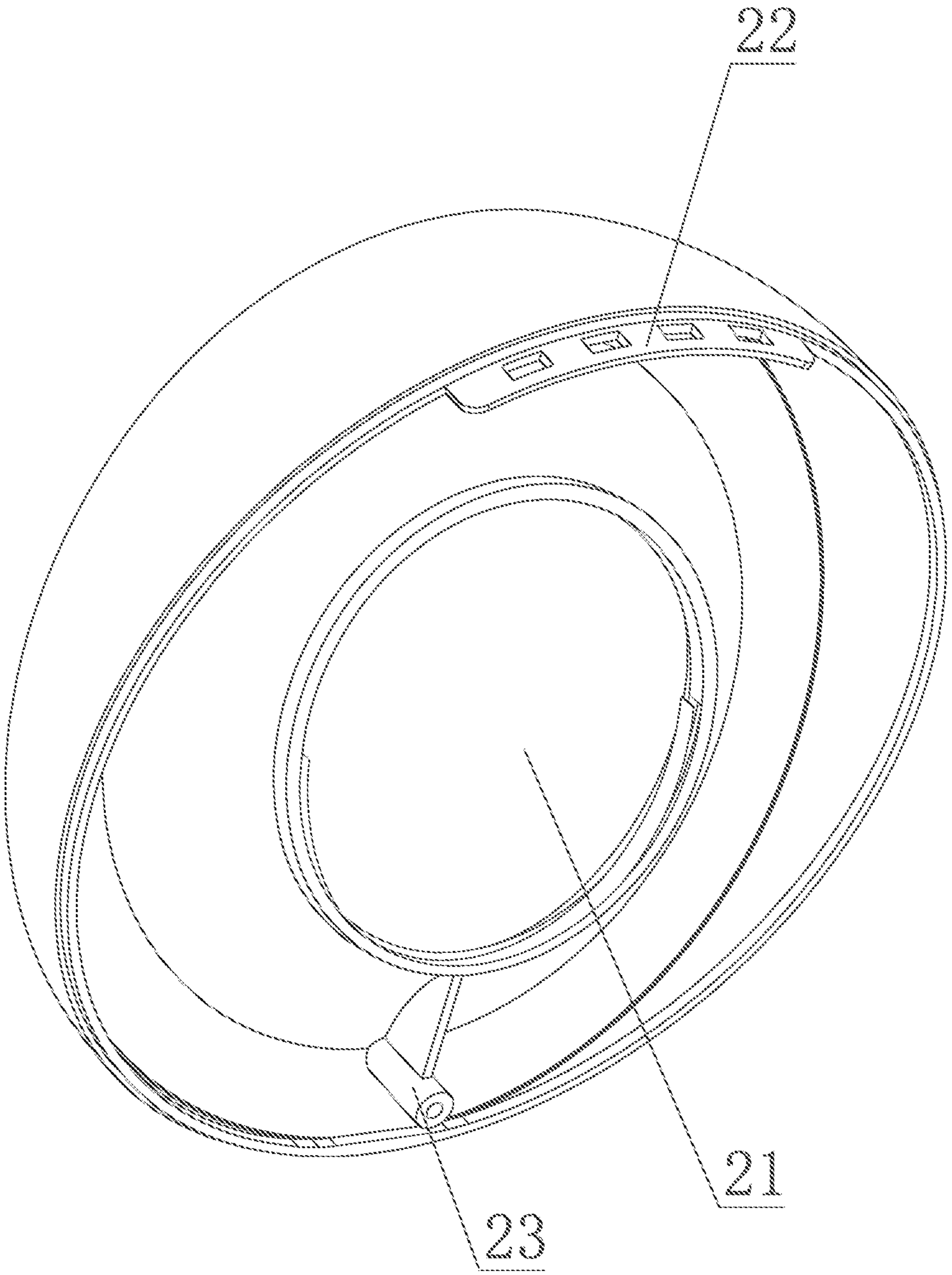
FIG. 5 is a schematic diagram of an internal structure of a spotlight cover of the present disclosure.

As shown in FIG. 4, the bottom shell 1 is provided with a power switch hole 14, and the power switch button 4 is arranged at the position of the power switch hole 14. The bottom shell 1 is provided with a power supply socket 15, the circuit board is electrically connected with a power plug, and the power plug is arranged in the power supply socket 15.

The heat dissipation principle of the present disclosure is as follows: the heat dissipation fan blows towards the laser, and is configured to cool the laser. The hot air quickly spreads inside the entire shell, and fully contacts with the shell. Heat is exchanged by utilizing the surface of the shell and the external environment, to reduce the temperature inside the entire shell. In order to improve the effect of cooling the shell, metal materials can be used to make the shell. In order to improve the insulation effect, the inner and outer surfaces of the shell can be coated with a layer of oxidized graphene insulation and heat dissipation coating. In addition, the shell is provided with a plurality of heat dissipation holes, a dustproof sponge is arranged inside the shell, and the dustproof sponge covers the plurality of heat dissipation holes, such that air exchange between the inside of the shell and the external environment can be achieved, the heat dissipation effect is improved, and dust in the external environment is prevented from entering the shell through the plurality of heat dissipation holes, so as to avoid pollution to electrical elements.

In summary, the present disclosure fully utilizes the heat dissipation function of the shell when cooling the laser, further improving the heat dissipation effect.

The above descriptions are only preferred embodiments of the present disclosure and are not intended to limit the present disclosure, and various changes and modifications may be made to the present disclosure by those skilled in the art. Any modifications, equivalent substitutions, improvements, etc. within the spirit and principles of the present disclosure are intended to fall within the scope of protection of the present disclosure.

What is claimed is:

1. A starry sky lamp with good heat dissipation effect, comprising a shell, and a laser and a circuit board arranged in the shell, wherein the laser is electrically connected with the circuit board, and further comprising a light-transmitting cover (3) and a heat dissipation fan, wherein the heat dissipation fan is arranged in the shell, and the heat dissipation fan is electrically connected with the circuit board and blows air towards the laser; and the shell is provided with an opening (21), the light-transmitting cover (3) is installed at the opening (21), the light-transmitting cover (3) is a semi-circular hollow structure, a starry sky effect pattern cutting surface is arranged inside the light-transmitting cover (3), and the laser beam emitted by the laser is reflected and transmitted through the light-transmitting cover (3), to form a starry sky pattern under the action of the starry sky effect pattern cutting surface.

2. The starry sky lamp with good heat dissipation effect according to claim 1, wherein the shell comprises a bottom shell (1) and a spotlight cover (2), an upper end of the bottom shell (1) is opened, the spotlight cover (2) is installed at the upper end opening of the bottom shell (1), and an opening (21) formed on the shell is located on the spotlight cover (2).

3. The starry sky lamp with good heat dissipation effect according to claim 2, wherein the bottom shell (1) is provided with a flat plate portion (11), a connecting tube base (12) is arranged on the flat plate portion (11), and the connecting tube base (12) is located in the bottom shell (1); a plurality of snap blocks (13) are arranged on the upper end opening of the bottom shell (1), and the snap blocks (13) and the connecting tube base (12) are respectively located at opposite ends of the bottom shell (1); and the spotlight cover (2) is provided with a snap plate portion (22) and a connecting tube portion (23), wherein the snap plate portion (22) is provided with a plurality of snap-fitting holes corresponding to the snap blocks (13) one by one, the connecting tube portion (23) is provided a threaded hole, the positions of the snap-fitting holes and the connecting tube portion (23) correspond to the snap blocks (13) and the connecting tube base (12) respectively, the connecting tube base (12) and the connecting tube portion (23) are connected by a bolt penetrating into the connecting tube base (12), and the screw portion of the bolt is screwed into the threaded hole of the connecting tube portion (23).

4. The starry sky lamp with good heat dissipation effect according to claim 1, wherein the light-transmitting cover (3) comprises a semi-circular hollow structure portion (31) and a flat flange portion (32), the semi-circular hollow structure portion (31) and the flat flange portion (32) share a common central axis, the outer diameter of the flat flange portion (32) is greater than the outer diameter of the semi-circular hollow structure portion (31), the opening (21) is a circular opening with a diameter same as the outer diameter of the semi-circular hollow structure portion (31), and the semi-circular hollow structure portion (31) extends out of the shell from the opening (21).

5. The starry sky lamp with good heat dissipation effect according to claim 2, wherein the spotlight cover (2) is provided with a concave spotlight reflecting surface (24), and the opening (21) is arranged at the center of the spotlight reflecting surface (24).

6. The starry sky lamp with good heat dissipation effect according to claim 2, wherein the bottom shell (1) is provided with a power switch hole (14), the circuit board is electrically connected with a power switch button (4), and the power switch button (4) is arranged at the position of the power switch hole (14).

7. The starry sky lamp with good heat dissipation effect according to claim 2, wherein the bottom shell (1) is provided with a power supply socket (15), the circuit board is electrically connected with a power plug, and the power plug is arranged in the power supply socket (15).

8. The starry sky lamp with good heat dissipation effect according to claim 1, wherein the shell is made of metal materials, and the inner and outer surfaces of the shell are coated with a layer of oxidized graphene insulation and heat dissipation coating.

9. The starry sky lamp with good heat dissipation effect according to claim 1, wherein the shell is provided with a plurality of heat dissipation holes, a dustproof sponge is arranged inside the shell, and the dustproof sponge covers the plurality of heat dissipation holes.

* * * * *